April 16, 1963 W. L. GEIST 3,085,481
MACHINE FOR THE PRODUCTION OF HELICALLY WOUND TUBES
Filed Feb. 25, 1960 7 Sheets-Sheet 1
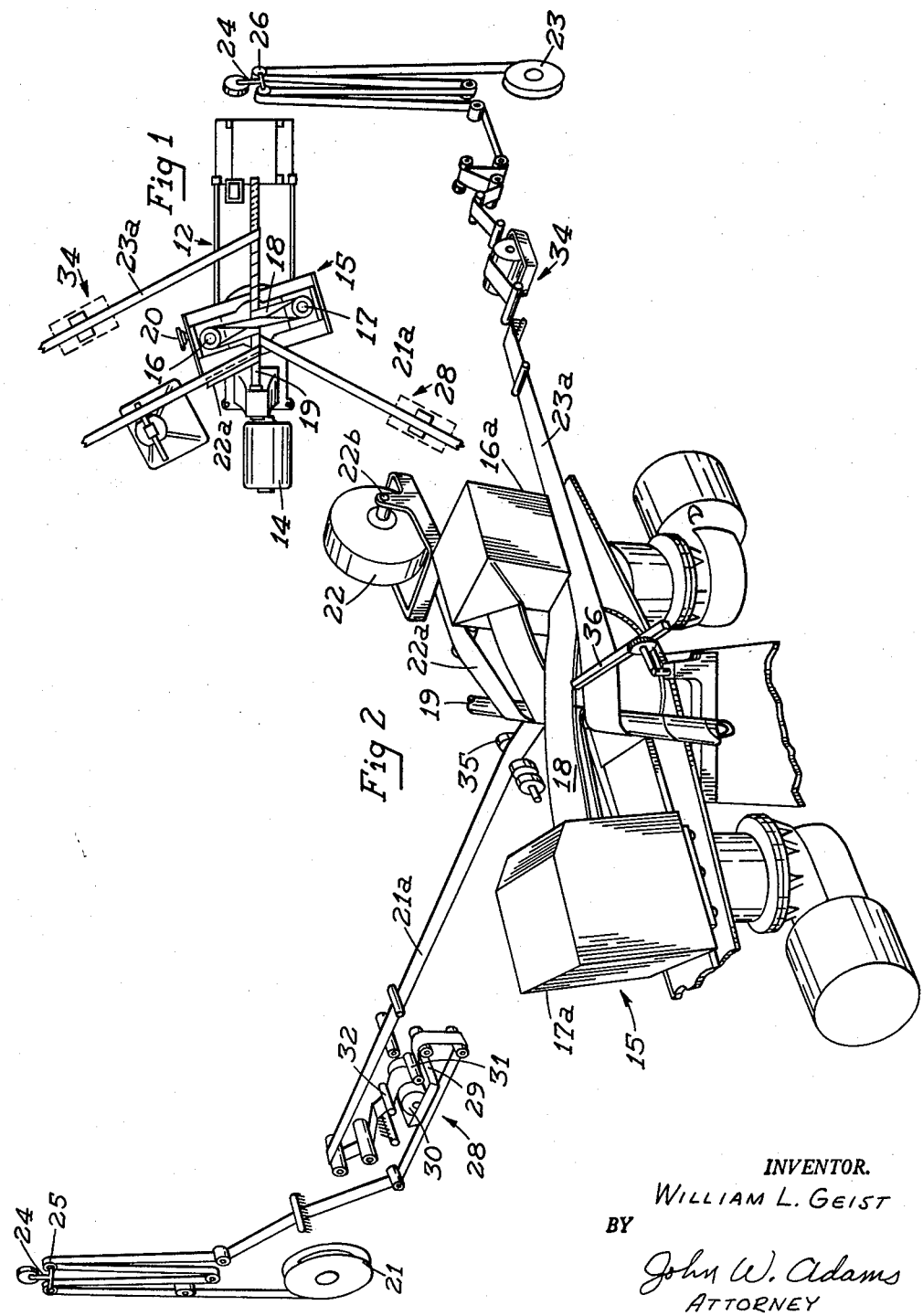
INVENTOR.
WILLIAM L. GEIST
BY
John W. Adams
ATTORNEY April 16, 1963 W. L. GEIST 3,085,481
MACHINE FOR THE PRODUCTION OF HELICALLY WOUND TUBES
Filed Feb. 25, 1960 7 Sheets-Sheet 2

INVENTOR.
WILLIAM L. GEIST
BY
John W. Adams
ATTORNEY

April 16, 1963          W. L. GEIST          3,085,481

MACHINE FOR THE PRODUCTION OF HELICALLY WOUND TUBES

Filed Feb. 25, 1960          7 Sheets-Sheet 3

INVENTOR.
WILLIAM L. GEIST
BY John W. Adams
ATTORNEY

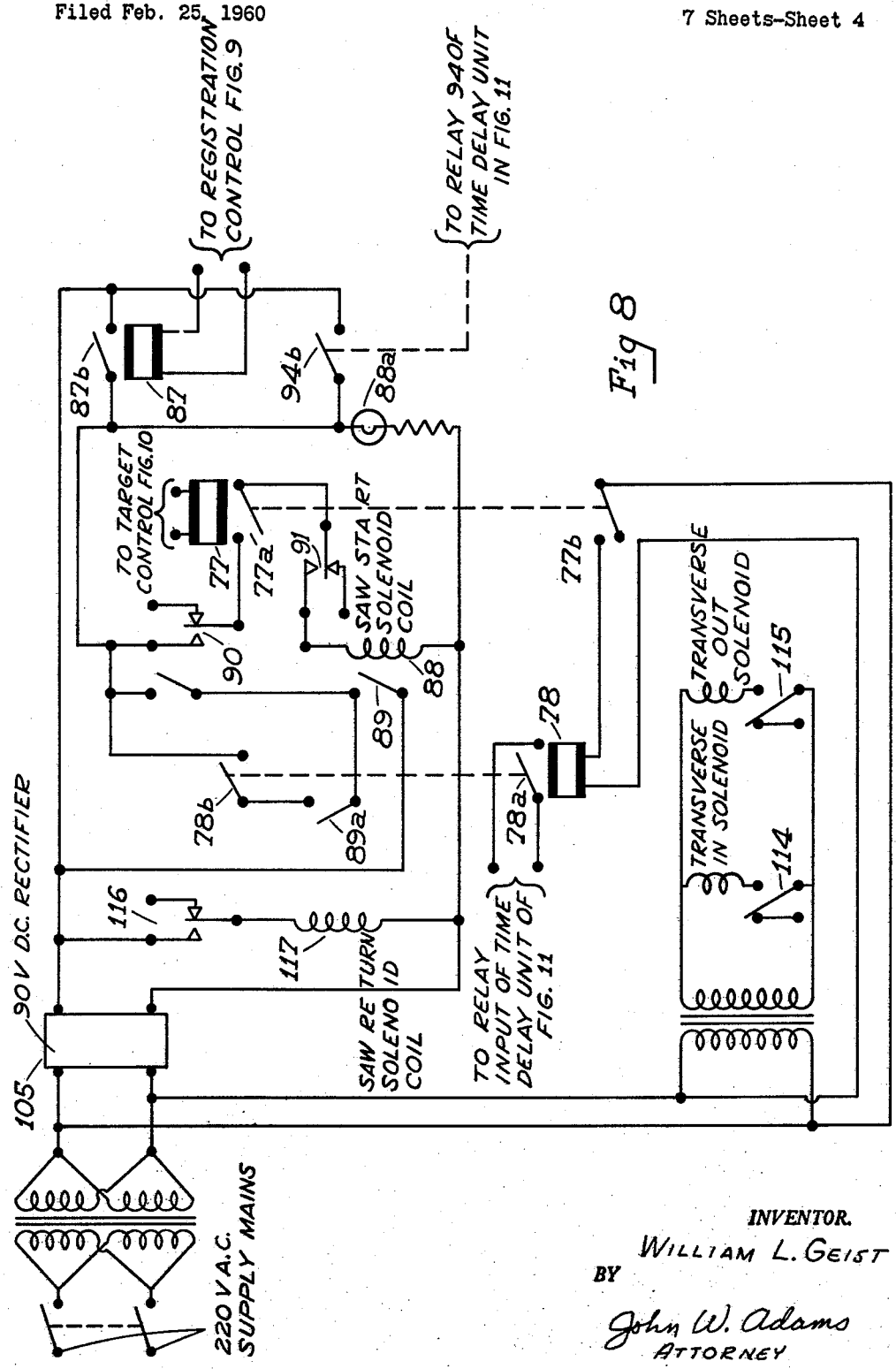

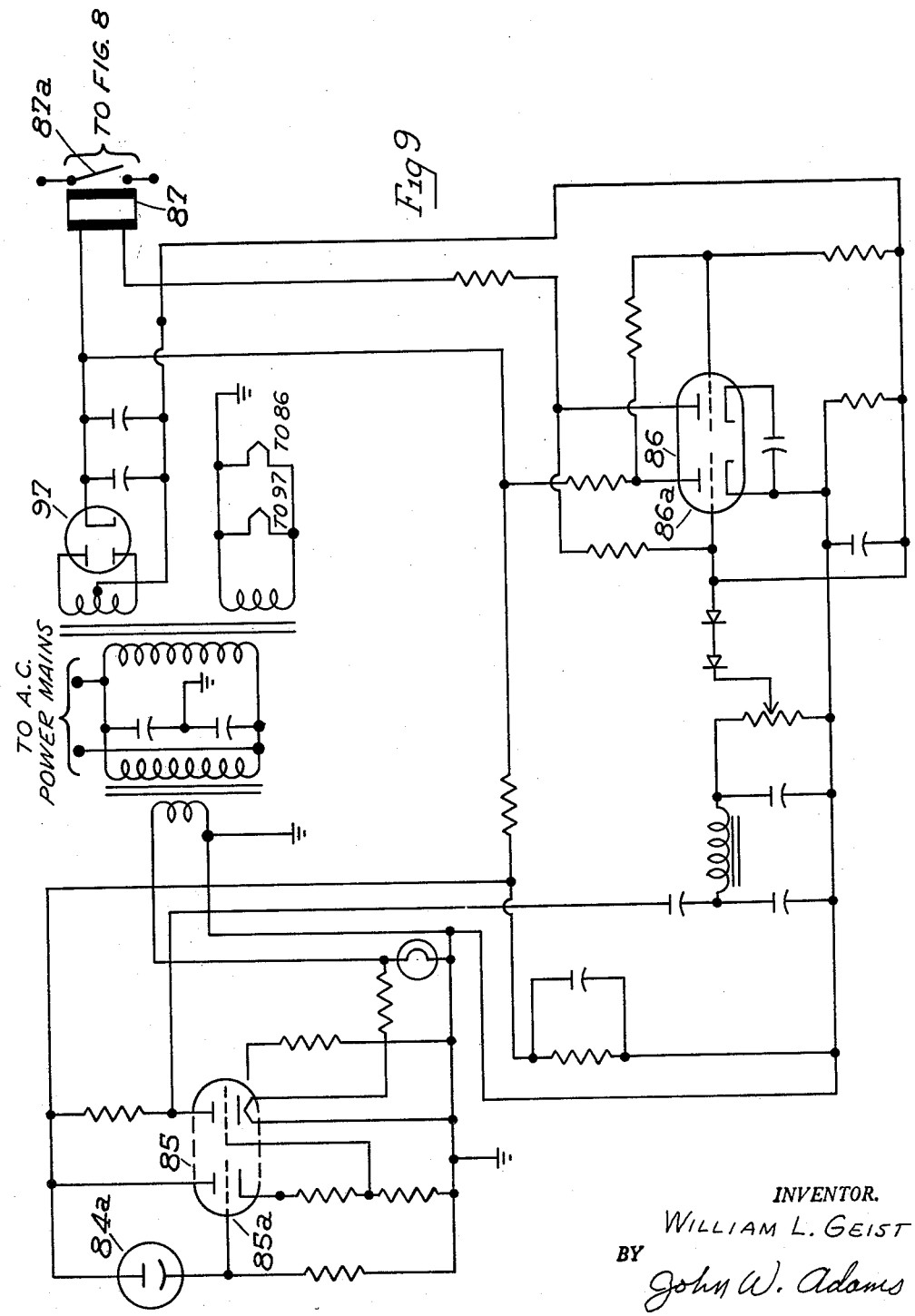

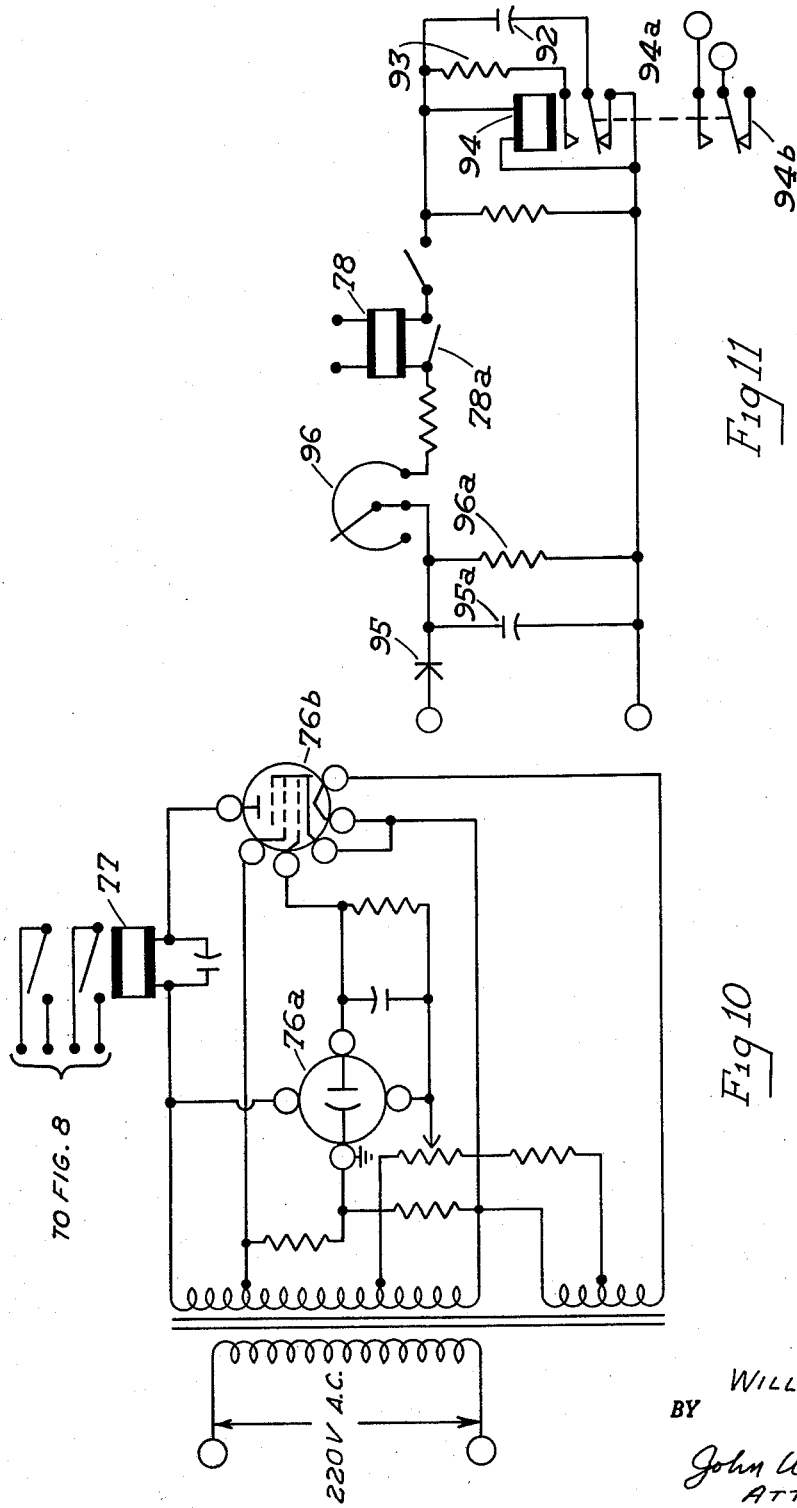

April 16, 1963   W. L. GEIST   3,085,481
MACHINE FOR THE PRODUCTION OF HELICALLY WOUND TUBES
Filed Feb. 25, 1960   7 Sheets-Sheet 7

INVENTOR.
WILLIAM L. GEIST
BY John W. Adams
ATTORNEY

United States Patent Office 3,085,481
Patented Apr. 16, 1963

3,085,481
MACHINE FOR THE PRODUCTION OF
HELICALLY WOUND TUBES
William L. Geist, St. Louis, Mo., assignor to RC Can Company, St. Louis, Mo., a corporation of Missouri
Filed Feb. 25, 1960, Ser. No. 11,066
11 Claims. (Cl. 93—80)

The present invention relates to an improved apparatus for preparing helically wound tubes of paper, fiberboard, or the like, and more specifically to an apparatus of this type which continuously and expeditiously fabricates helically wound tubes in such a manner that increased production rates are achieved along with the formation of decreased quantities of waste.

At the present time, apparatus are employed in the art for the fabrication of helically wound tubes, the present apparatus leaving certain features to be desired, particularly in connection with continuous substantially waste-free operation. For example, currently available machines are arranged so as to provide the conventional winding mandrel, the power for the winding being provided preferably by an endless belt which transverses the strip or stock being wound. The raw material is conventionally arranged exteriorly from a point near the mandrel and comes in contact with the winding mandrel at a certain predetermined angle of attack, depending on the width of the strip as well as the degree or extent of overlap desired in the finished production of the individual strip. Downstream along the mandrel cut-off means are provided, the cut-off means being designed to function periodically depending upon the manner in which the finished tubes are arranged to be severed. In this connection, the cut-off means may be provided either with a single severing instrument or a gang of these instruments. Conventionally, the cut-off mechanism is normally energized by any of a number of schemes, for example, a mechanical target may be positioned at or near the terminating point of the winding mandrel, and the finished stock arranged to strike the mechanical target. The impact with the finished stock forces the mechanical target to move and thereby actuate the control means controlling the instrument for severing the finished tubes. Inasmuch as apparatus of this type are normally inaccurate by their very nature, errors in cutting do occur and waste material is formed thereby. These inaccuracies obviously tend to cause the tubes to be severed at a point or points remote from the end portion of an individual tube, or at the juncture point between two adjacent tubes on the continuous oven of tubes along the mandrel. In the past this difficulty has been overcome in part by fabricating the tubes with a discontinuous outer layer, thereby providing a relatively larger cutting area between two adjoining tubes, or alternatively the tubes have been indiscriminately severed at a point along the body of one of the tubes in the series. Either practice is uneconomical from the standpoint of production speed and from the production of waste material.

In the production of a continuous tube having a series of repetitive designs, each complete pattern series representing a single tube, it is possible to provide remotely positioned photo-electric means or other condition responsive apparatus for sensing a certain predetermined spot or the like along each of the tubes in the series being formed, without actual physical contact with the tubing being formed. For automatic and rapid operation of such a device, however, it is normally preferable to employ a severing mechanism which will sever a group or series of integral tubes with a single cut without making it necessary to sever each individual tube as it leaves the winding mandrel. While such a cutting arrangement could conceivably be made, cutting individual tubes in single units, it has been found more expeditious to sever the tubes as a group. The individual severing may conveniently be carried out in a separate operation. Of course, such a scheme makes it essential that a second sensing source be employed in the apparatus so as to detect the substantial completion of a predetermined integral number of tubes from the winding mandrel. It is seen therefore, that dual detecting stations are required for properly severing the tubes at the desired points. In addition, because of continuous operation of the apparatus, it is preferred that the tension on each of the individual tubes being formed be controlled so as to maintain a predetermined consistent tension at all times on the stock throughout the winding operation. Furthermore, it is essential that the winding speed of the mechanism be substantially constant and be synchronized with the longitudinal speed of the transverse cut-off mechanism.

According to the present invention, an improved apparatus for production of helically wound tubes is provided having improved detecting and circuit means for arranging the cut-off operation to function at a desired point after a certain predetermined integral number of tubes have been wound on the mandrel. The detecting means includes a target control portion for detecting the substantial completion of a certain predetermined number of tubes and a register control portion which detects a precise point along the tube which informs the cut-off mechanism of the point of time at which the cut should be made. The target portion preferably utilizes a photo-electric cell together with a companion light source, the source being interrupted upon the arrival of the leading edge of helically wound tubing, the detection being acomplished without physical contact with the tubing. Because the tubing is somewhat soft mechanically, physical impact with the tubing will cause inaccuracies to occur in the cutting operation. This target control is positioned relative to other portions of the mandrel so as to indicate the substantial completion of a certain predetermined integral number of tubes. The register portion of the control means likewise preferably includes a photo-electric cell together with a light source in combination therewith which combination is arranged to detect the presence of a predetermined mark or spot on a surface of one of the bands of the composite wound tubes without physical contact therewith. Accordingly, while the register portion will detect a given spot from each tube, as it is formed, the entire circuit means or cutting means is insensitive to this individual detection unless the circuit has been previously reset by the detection of the substantial completion of an integral, predetermined number of tubes by the target control portion. The photocell from the register control circuit is preferably positioned in close proximity to the saw performing the cutting. This location is essential to fine accuracy inasmuch as the cylinders are normally fabricated from materials which are resilient to a certain extent and closer control is thereby possible. It will be appreciated that any errors in cutting can become cumulative and thereby make it possible for substantial economic losses to occur particularly in high production machines of this type. The present invention permits continuous operation with a minimum of outside influences acting to change the nature of the flow of the material from the winding mandrel through the cut-off portion of the apparatus. With this uniformity existing throughout the equipment, extreme accuracy is possible with a resultant minimum of loss due to waste material.

Briefly, in operation, the function of the control means is begun upon detection of finished tubing in the area of the target control, and shortly thereafter, in point of time, the register control portion detects the presence of a predetermined spot on the next superseding integral tube. The cut-off mechanism is then started along a predetermined path, preferably at a speed which exactly coincides with the speed at which the material being wound on the mandrel is moving, and upon traversing a certain predetermined distance, and after the equal running speeds have become established, the cut-off mechanism is rotated into engagement with a peripheral portion of the wound tubing and a cut thereby made at a certain predetermined point for example, exactly at the juncture between two adjoining tubes. In this fashion, rapid continuous operation of the apparatus is possible along with a minimum of waste.

It is therefore an object of the present invention to provide an improved apparatus for the production of helically wound tubes wherein continuous high speed operation is made possible together with the production of a minimum of waste.

It is a further object of the present invention to provide an improved apparatus for the production of helically wound tubes wherein automatic sensing means are provided for precise severing of the tubes at predetermined points along the juncture between adjoining tubes.

It is yet another object of the present invention to provide an improved apparatus for the production of helically wound tubes which utilizes, in combination, a photoelectric target control portion and a photo-electric register control portion, which are designed to co-operate, one with the other, in controlling the severing of the wound tubing at predetermined locations.

Other and further objects of the present invention will become apparent to those skilled in the art from a study of the following specifications, appended claims and accompanying drawings wherein:

FIG. 1 is a top plan view of the winding portion of an apparatus prepared in accordance with the present invention;

FIG. 2 is an isometric view of the portion of the apparatus illustrated in FIG. 1 on a slightly enlarged scale, and illustrating the location of the supply rolls provided therewith;

FIG. 8 is a schematic view showing a preferred circuitry arrangement of the control portion of the cut-off devices utilized in the present invention;

FIG. 9 is a schematic circuit diagram of the registration control portion of the cut-off devices utilized in the present invention;

FIG. 10 is a schematic circuit diagram of the target control portion of the circuit utilized in the cut-off devices of the present invention;

FIG. 11 is a schematic circuit diagram of a time-delay network which is employed in connection with the circuitry of the present invention;

Figure 4:
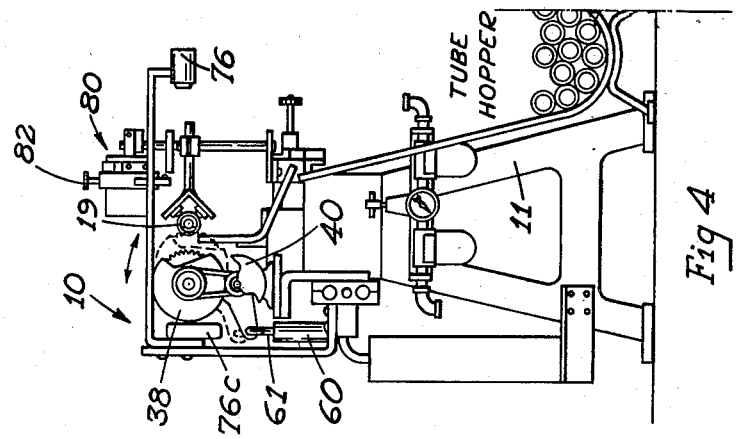
FIG. 4 is an end view of the portion of the apparatus illustrated in FIG. 3.

In accordance with the preferred modification of the present invention, a tube winding apparatus generally designated 10 is provided having a suitable support bed and table 11 for mounting the equipment utilized in the present invention. The tube winding apparatus is provided with a pair of stations, the first of which is a winding station generally designated 12, the other being a cut-off station generally designated 13. Each of these stations are arranged to co-operate, one with the other, in the preparation of elongated sections including a predetermined integral number of wound tubes. In this connection, the raw material is brought together in the tube-winding section and the tubes are fabricated in a continuous fashion along this portion of the device. Periodically, at certain spaced time intervals, the cut-off portion of the device functions to sever the continuously wound tube into a plurality of segments of integral numbers of tubes, each segment being designed to be subsequently individually severed along predetermined locations thereon. Of course, the speeds of the two stations, the winding station 12 and the cut-off station 13 are synchronized in order that the segments may be properly severed with an absolute minimum of waste material being formed in the process.

Referring now specifically to the winding station, particular reference is made to FIGS. 1 and 2 of the drawings wherein this portion of the machine is shown in substantial detail. The winding portion 12 includes a suitable power source 14 such as a squirrel cage induction motor integral with eddy current adjustable speed magnetic coupling or the like. This power source is arranged to drive among other things, the winding belt network generally designated 15. The winding belt network 15 includes a pair of pulley members 16 and 17 housed in enclosures 16a and 17a which pulleys are arranged to drive the endless belt 18 along a predetermined driving path. Belt 18, it will be observed, particularly in FIG. 2, passes over and around a winding mandrel 19 which is surrounded at that point by a substantially continuous ribbon of strip or stock material wound helically therearound. In this fashion, the belt 18 provides a continuous driving force for the various portions or segments of the continuously wound helical tubes. The tension on belt 18 may be readily adjusted or controlled by means of a threaded adjusting shaft, not shown, which is integrally connected to an adjusting wheel 20. The apparatus, while in operation, draws material from a plurality of supply rolls of raw material situated adjacent the winding mandrel 19, the raw material being supplied in the form of rolls 21, 22 and 23. Each of the rolls is provided with an associated tensioning network in order that substantially constant tension may be maintained on the material being supplied to the winding mandrel. This tensioning means may be arranged in any of a number of ways, for example, the arrangement of the glue supply rolls at 28. The pulley carriers 24—24, which are operatively associated with the pulley blocks 25 and 26 permit splicing on a new roll without stopping the machine. The supply rolls are, of course, arranged in accordance with a desired pulley arrangement which in addition to facilitating proper tension and winding of the material onto mandrel 19, further provides, if desired, suitable glue applying stations and the like. For example, the glue applying station, generally designated 28 is provided in the course of travel of the supply from roll 21. The glue applying station includes a reservoir 29 along with an applicator roll 30 which extends into the glue supply normally retained in the reservoir 29. Suitable studs, for example, studs 31 and 32 are provided for properly tracking supply material across the applicator roll or drum 30. The glue applying station, generally designated 34, for roll 23 functions in substantially the same manner as the glue applying station 28. The supply material is, of course, applied to the mandrel in such a way that the face having the glue applied thereon is properly oriented relative to the remaining strip portions of the tube supply. Downstream from the glue applying station 28, an adjustable angle attacking roller 35 is provided, the approach angle or angle of attack at which the strip 21a strikes the winding mandrel 19 being dependent upon the width of the stock as well as the extent of overlap desired between successive revolutions in the finished product. Of course, if an ordinary butt-joint is preferred, the angle of attack may be properly determined. These angles may be readily determined by those skilled in the art relative to any given situation. Supply roll 22 is a roll providing the initial strip or layer 22a for the finished tube product. The tension, if desired, may be provided in the mounting shaft 22b upon which roll 22 is mounted. Appropriate glue arrangements between the inner layer 22a and superimposed layer 21 are provided in order that this and the next succeeding layers form a single composite unit. Roll 23 provides a continuous strip of finished or outer covering material 23a which is applied along the outer surface of the layer 21a. A suitable gluing system is set up between the outer layer 23a and the intermediate layer 21a, in order that the finished product may be properly fabricated. If desired, parallel glue strips may be provided which straddle the butt-joint of the center layer to facilitate easy opening of the tube. A tiltable guide blade 36 is arranged in the path of the strip 23a after it leaves the roll 23 and immediately prior to the time that it is wrapped upon the surface of the partially formed tubing. This is utilized to direct the material onto the mandrel at a proper angle. The finished product is therefore rendered uniform along its outer film covering.

In operation, the belt 18 frictionally drives the layers 21a and 22a directly, the rotation of these layers, in composite, providing a force for driving or bringing overlying film 23a into contact with the previously formed material. While the inner layer 22a may be preferably fabricated from a lacquered foil or the like, any material which will not tarnish or oxidize when exposed to the mandrel surface and which will provide low frictional contact therewith will be suitable. The strip 21a, preferably the body stock, is provided with a suitable layer of wet glue or the like for attachment or bonding to the lacquered foil inner surface. The outer label includes suitable indicia thereon and is glued onto the surface of the intermediate fiberboard layer. Suitable glue ribbons are arranged along the inner-surface of the outer layer 23a in order to attach it or bond it to the remaining portions of the tubes. The outer label includes repetitive patterns for the series of tubes and also includes a suitable reflective target for use in the detecting or target portion of the cut-off section of the apparatus. Regarding overlap, the initial lacquered foil strip is overlapped, for a tube blank which is about 2 inches in diameter, from between ⅜ and ½ inch. The body stock is butt-jointed, the joint, of course, being out-of-register with the joint in the inner lacquered foil layer. The outer layer is arranged to be overlapped on itself about ¼ inch, the degree of overlap being predetermined and accommodated in the indicia appearing on the outer surface thereof.

Figure 3:
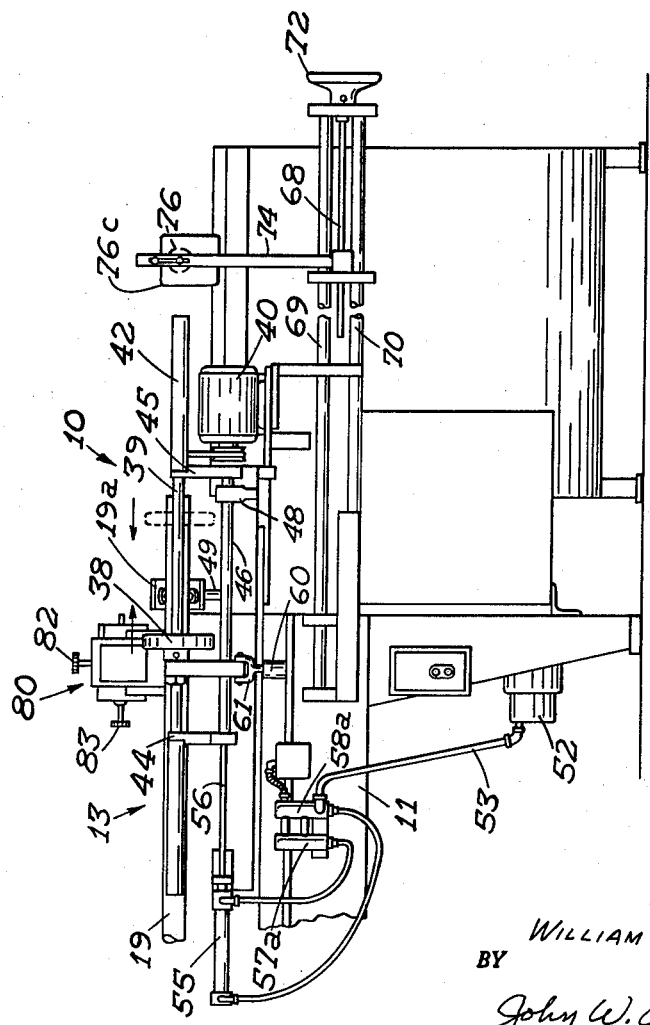
FIG. 3 is a side view of the cut-off portion of the apparatus prepared in accordance with the present invention.
Figure 5:
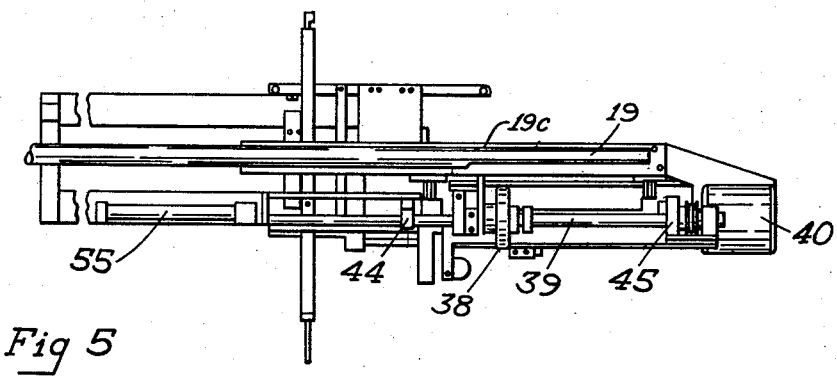
FIG. 5 is a top plan view of the portion of the apparatus as shown in FIG. 3.

Referring now to the cut-off portion of the apparatus, particular attention is directed to FIGS. 3, 4 and 5 of the drawings for a more detailed description thereof. The winding mandrel 19 continues into and through the cut-off portion 13 of the apparatus, being supported on resiliently biased caster knobs 19a—19a, the previously wound tubing being arranged to traverse the extent of the mandrel and to be cut off at appropriate intervals. The cut-off portion 13 is equipped with a saw blade 38 which is adapted for rotation about a splined shaft 39. The shaft 39 which provides a track for saw 38, is driven by any suitable power means such as motor 40, the rotational energy being transmitted to the shaft 39 by belt 41. The splined drive, not shown, is conventional in nature and is found within the housing or guard 42. Saw 38, spline shaft 39 and the associated networks are mounted on bell crank arms 44 and 45, these crank arms being attached to mounting shaft 46 and arranged for pivotal rotation within retainer members 48 and 49. The retainers 48 and 49 are, of course, anchored to the bed 11 and are stationary therewith. Further associated with the saw 38 and the mechanism described hereinabove is a double acting air powered cylinder 60 which is arranged to provide energy through crank arm 61 for tilting the saw 38 about the shaft 46, the saw being thereby arranged to engage and sever a transverse section of the wound product. In order that the saw may be able to sever the tube in a transverse fashion, that is, at right angles to the longitudinal axis thereof, the splined shaft 39 is arranged to move longitudinally, carrying the saw blade 38 along therewith, the speed of travel being exactly equal to the longitudinal component of speed of the finished helically wound tube bodies. Double acting hydraulic cylinder 55 propels the saw carriage apparatus longitudinally at a speed precisely equal to the longitudinal speed of the tubing along the mandrel. The actual cut is made along the recessed portion 19c of the mandrel 19. Therefore, in operation, the saw blade, while rotating about the splined shaft 39 is set into motion longitudinally at a rate of speed equal to the longitudinal rate of travel of the helically wound tubes. Upon reaching speed, the saw is driven pivotally about shaft 46 to engage and sever the longitudinally moving tube body about the periphery thereof, the saw thereafter being retracted to the normal position which is spaced from the travel of the tube body. Upon returning to the normal retracted position, the saw is carried or driven back to the starting position and it is then ready for the next subsequent operating cycle.

Figure 12:
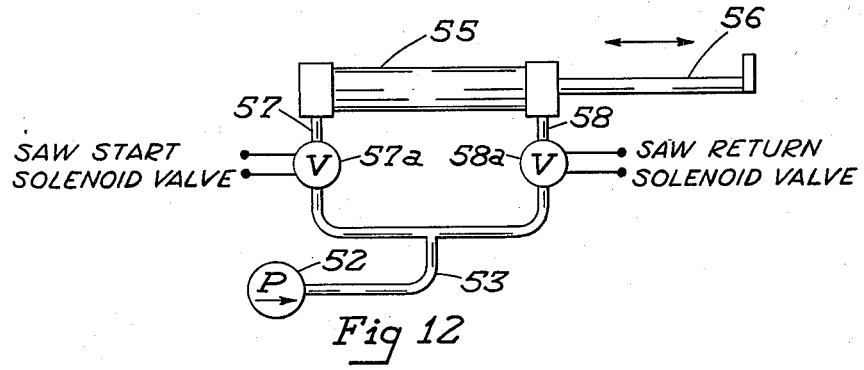
FIG. 12 is a schematic diagram illustrating the hydraulic network which is utilized in the longitudinal traverse of the cut-off apparatus in accordance with the present invention.

Reference is made to FIGS. 11 and 12 which illustrate schematically, the function of the saw or cut-off mechanism per se. With particular attention to FIG. 12, pump 52 provides a source of constant hydraulic pressure along line 53. A double acting hydraulic cylinder 55 is arranged with an operating shaft 56 which is arranged to be driven either inwardly or outwardly from the cylinder housing. A pair of supply lines 57 and 58 are provided which act as conduits between the pump 52 and cylinder 55, line 57 being arranged to supply energy to move the shaft outwardly of the cylinder, line 58 being arranged to supply energy to drive the shaft inwardly. Solenoid valves 57a and 58a are provided in the individual lines and control the flow of fluid to the cylinder from the pressure sources. Suitable control circuitry, described later, controls and actuates solenoid valves 57a and 58a. The output volume of motor driven pump 52 is arranged to precisely synchronize the speed of longitudinal travel of operating shaft or arm 56 with that of the wound tubing or tube body. The valving network is arranged to continue application of pressure in one direction or another until such time as a change in flow direction is indicated.

Figure 13:
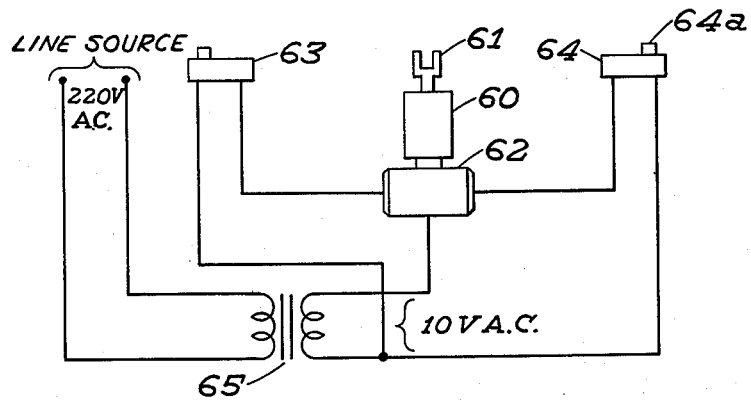
FIG. 13 is a schematic drawing illustrating certain aspects of the transverse operation of the cut-off network utilized in connection with the present invention.

Referring now to FIG. 13, the transverse cylinder 60 having an operating or crank arm 61 is provided to handle pivotal rotation energy to the saw blade per se. Pressure source 62, preferably retaining air under pressure, is operatively associated with the cylinder 60. A pair of limit switches 63 and 64 are associated with the cut-off saw carriage or track and are arranged to control the pressure means 62 for actuating the cylinder 60. Accordingly, in operation, the saw body 38 after having been set into longitudinal motion by cylinder 55 strikes the transverse air cylinder start switch 63 which releases a charge of compressed air from pressure chamber 62 into cylinder 60 and thereby actuates arm 61 to cause pivotal rotation of the saw about shaft 46. Upon further transversal, the saw 38 passes over the transverse return limit switch 64 and thereby actuates the switch and causes a second charge of compressed air to move into cylinder 60. Inasmuch as the cylinder is double-acting the second charge retracts the arm 61 back into the cylinder body and thereby rotates or pivots the saw away from and out of contact with the finished helically wound tube body. A suitable power source is provided as indicated in FIG. 12 and the transformer 65 is provided, if necessary, for the equipment selected. The valving arrangement is such that pressure is maintained in one direction until a change in direction is indicated.

The control means which drives the various portions of the apparatus described hereinabove will now be explained along with their various functions. The control apparatus is provided with an individual target control portion and an individual registration control portion. In addition, position sensing control means in the saw actuating circuit are provided to assist in proper operation of the equipment. Referring now to the target control portion, this is illustrated and shown generally in FIGS. 3 and 6 at 67. The target control is mounted on the threaded mounting shaft 68 which is arranged for longitudinal travel along spaced anchoring shafts 69 and 70, these anchoring shafts being securely mounted to the bed 11 as at 71. An adjustable wheel 72 is provided which, upon rotation, will move registration control assembly 67 longitudinally of the apparatus and parallel to the winding mandrel as desired. In this fashion, the target control may be placed at any desired point along the longitudinal path of travel of the finished helically wound tubes. The upright bracket 74 mounts a suitable light or other radiant energy source coupled with an associated photocell, the units being designated 76 and 76c respectively. Target cell 76a may preferably be of the conventional photoresistive type such as lead sulfide, lead selenide or the like and is accordingly responsive to changes in incident radiation. It will be appreciated that other condition responsive means may be utilized here for this operation provided the means are capable of remotely sensing the change of condition. The path transversed by the light source, which preferably may include a conventional lens arrangement is an imaginary extension of the mandrel 19. Accordingly, as the helically wound tube moves longitudinally, the light path from the source arranged within unit 76 is interrupted and no longer strikes the photocell in unit 76c. The corersponding signal from the photocell is amplified in an amplifier in accordance with the diagram in FIG. 10. In this connection, a suitable bias potential is applied across the photocell 76a, the potential being supplied by a suitable source as indicated in FIG. 10.

Tube 76a, which is normally non-conductive, is conductive upon the sensing of radiant energy from the accompanying lamp source. Upon becoming non-conductive, the change in potential causes the thyratron generally designated 76b to fire, thereby providing sufficient potential across the coil of relay 77 to pull in the dual contacts 77a and 77b. Therefore, upon sensing of a wound tube in the area viewed by the photocell unit 76, the circuitry components act to reset the circuit for further operation upon the next succeeding functioning event of the register portion of the device. It will be observed that contacts 77b cause actuation of the time delay unit which is shown in detail on FIG. 11. The function of the time delay unit is to provide for positive operation of the saw cutting mechanism a given period of time subsequent to the actuation of the relay contact 77b, the time delay unit operating an independent relay contact which is arranged in electrical parallel relationship to the relay contacts in the registration control portion of the device. It will be further observed that the closing of relay contact 77b closes contacts 78a and 78b of relay 78, contact 78b being arranged in the saw-start portion of the circuit, shown diagrammatically in FIG. 8. This waste-saving arrangement positively causes the saw to make a cut regardless of whether or not the registration control subsequently functions properly.

Figure 6:
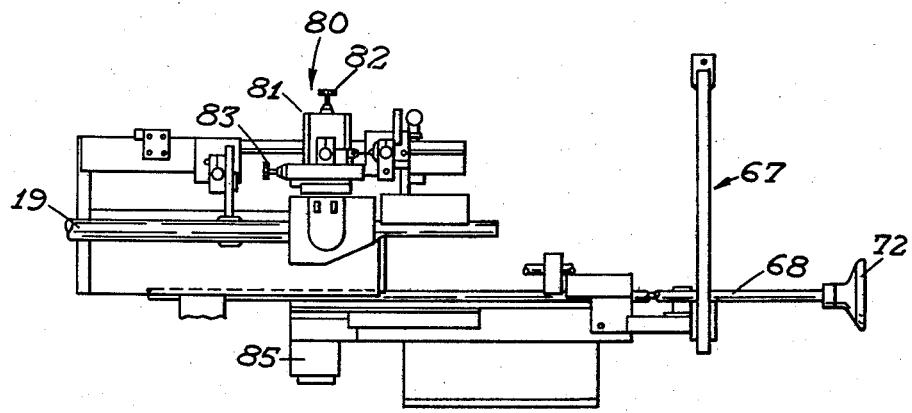
FIG. 6 is a top plan view of the photo-control assembly alone in accordance with the present invention and illustrating that portion of the apparatus as shown in FIG. 3.

The register control portion of the apparatus is shown generally at 80 this being shown in detail in FIGS. 3 and 6. The apparatus includes a suitable retainer 81 which is provided with adjusting screws 82 and 83 for precise positioning of the photocell combination light source. The apparatus includes a combined light or other radiation source and photo-sensitive cell unit designated 84, the photocell portion of which may, for example, be of the photo-resistive type as set forth hereinabove with respect to the target control mechanism. The precise positioning of the unit 84 is determined relative to the location of the target detection mechanism employed, and particularly with regard to the integral number of finished tubes desired in the severed sections. Once this location is established, the close adjustment of the position of the cell 84 may be readily established by empirical methods. The outer layer of the helically wound tubes is provided with a suitable reflective area or spot which lies in the path of the light source while the stock traverses the mandrel. The light strikes the reflective zone or spot and the reflected beam is detected by the photocell.

Referring now to the registration control as shown in FIG. 9, photocell 84a which is normally substantially non-conductive, is provided, this cell, of course, viewing the surface of the helically wound tubing. Upon the occurrence of a reflective spot of the path of the light source associated with unit 84, the reflected portion of the light causes a modification in the form of an increase in the conductivity of cell 84a, this modification in conductivity being directed to the grid 85a of the twin triode 85. The twin triode 85 is arranged to have a cathode follower output, this output being driven to the electronic bridge arrangement associated therewith and described hereinafter. It has been found that a photocell designated 1P39 or 925 will function satisfactorily in this circuit, as will the twin triode 7F7 having a cathode follower output. This provides for current amplification in this portion of the circuit. The signal obtained from this arrangement is directed to grid 86a of the double triode 86, this causing an unbalance in the output of double triode 86, the unbalanced output being sufficient to render the coil 87a of relay 87 operative. Contacts 87b are thereby closed, this closing the saw-start circuit and starting the flow of current through coil 88 which commences operation of the hydraulic system driving the saw longitudinally along the carriage track.

Referring now to FIG. 8, it will be seen that with manual switches 89 and 89a and with the closing of position sensing snap switches 90 and 91 positioned at the rest position of the saw, the unit is prepared to energize coil 88 as soon as target controlled relays 77 and registration control relay 87 are operative, thereby closing contacts 77a and 87b. Pilot light 88a is, of course, operative at the same time saw-start coil 88 is energized. It will be observed that the registration relay is supplied with direct current through a suitably filtered rectifier 97 as shown in FIG. 9. Suitable side tabs are, of course, made for establishing suitable heater current. It has been found that greater accuracy may be achieved in the registration control network when a rectified power source is made to the differential bridge arrangement.

Referring now to FIG. 11, a suitable time delay network is illustrated which network is arranged to cause cycling of the saw at a certain point of time subsequent to detection of tubing in the control area of the target control mechanism. It will be recalled that relay contacts 77b are closed upon energization of the target control relay 77. This in turn causes actuation of relay 78 closing contacts 78a which operates effectively as a signal input for the time delay mechanism shown in FIG. 11. Upon closing of contacts 78a, current flows through the time delay circuit charging up capacitor 92, the time constant of capacitor of 92 being determined in part by the resistance value of resistor 93. Upon reaching a suitable potential across the coil of relay 94, contacts 94a and 94b are closed, contact 94b being arranged in electrical parallel relationship with contact 87b of the registration control. Thus, if the registration control mechanism should malfunction, or should miss the necessary subsequent reflective spot after closing of the target control relay 77, the time delay circuit functions to take over and start the saw along its cutting cycle at a predetermined time subsequent to detection of material in the target control area. Therefore, good waste control is established by the mechanism rendering it substantially certain in operation. For its operation, a suitable source of direct current is made available to the time delay apparatus through diode 95 and the filtering capacitor 95a arrangement associated therewith. A voltage dividing network is arranged in the supply through potentiometer 96 and resistor 96a. Therefore, upon selection of the proper time interval for pulling in of contacts from relay 94 which is in part determined by the setting of potentiometer 96, it is possible to arrange the periodic cycling of the time delay circuit through proper selection of the setting of the potentiometer. It will be further observed that upon closing of contacts 94a, capacitor 92 is essentially fully discharged through resistor 93 and accordingly the unit is ready for another uniform time cycle or delay cycle after relay contacts 78 are again closed.

Should it be desired that the new saw cycle upon each occurrence of the tubing being present in the target control area, switches 89 and 89a are closed, thereby by-passing the registration control relay 87.

Reference is made to FIG. 8 of the drawings for a more complete description of the circuitry arrangement. The main power is supplied as indicated and is rectified across the rectifier 105. The register control relay is, shown at 87 and includes a time delay relay contact 94b arranged to actuate in the case of a malfunction in the registration control. The remaining portions of this circuit, for continuity, include the target control relay 77. The target control circuit includes a reset switch 91 in addition to the relay. In addition, at this point, it is essential that the saw be in the "start" position in order that both the reset switch and the saw-start switch 90 be closed. In his event, current flow is through the coil 88 controlling the saw-starting mechanism. This starts the saw on its longitudinal traverse at a speed which is coordinated or synchronized with the longitudinal speed of travel of the helically wound tubes. After the saw has traversed a certain portion of the path, the limit switch 114 is tripped causing current to flow in the "saw transverse in solenoid." This actuates the bell crank and pulls the saw 38 into contact with the periphery of the moving tubular members and severs a predetermined length of tubing from the wound portion. Upon traversing further longitudinally, the switch 115 is closed permitting current to flow through the "saw transverse out solenoid." This causes a return of the bell crank to the normal position, removing the saw from further contact with the moving tubes. The length of time during which the saw is permitted to remain in contact with the moving tubes is determined by the distance required for one complete rotation of the helically wound members. This, of course, can be readily determined by those skilled in the art in connection with the demands of any given operation. Upon a still further traverse of the saw, the saw-return switch designated 116 is closed which provides current flow through coil 117 providing a flow of current through the saw-return solenoid. The saw is then driven to the return position and retained there under pressure until the beginning of the next cycle. A steady bias is placed on the hydraulic cylinder mechanism driving the saw in the longitudinal direction in order to retain it in the start position for periods between operating cycles. It will be appreciated that the limit switch 90 and the switch 91 are positioned along the track and the normally opened switches are closed at all times while the saw is in the start position. When the saw leaves the start position, the switches return to their normally open positions which prevents further stray cycles from occurring causing pulses of current to pass through the saw-start solenoid at other than the desired times, inasmuch as both control portions may again sense a simultaneous event prior to the time the tubing is cut and removed from the "sight" of target arrangement. A manual switch 116 is provided for manual operation of the device when the control circuit is not desired for use.

Figure 14:
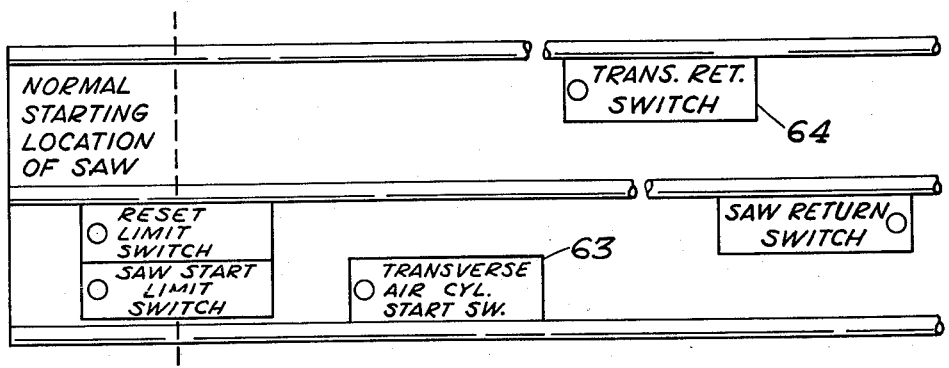
FIG. 14 is a schematic view of a portion of the control network utilized in connection with the present invention, and showing the various locations of the various position sensing switches and position indicating switches utilized in connection with the electrical control network of the present invention.

Reference is made to FIG. 14 which shows the relative positions of the various switches in connection with the cut-off apparatus of the present invention. It will be observed that the reset switch and the saw-start switch are arranged at one end of the longitudinal saw carrying track. A short distance therefrom, "transverse air cylinder return switch." At the end of the stroke is found the saw-return switch, the closing of this switch causing current to flow through the saw-return solenoid, thereby driving the saw back to the start position.

Figure 7:
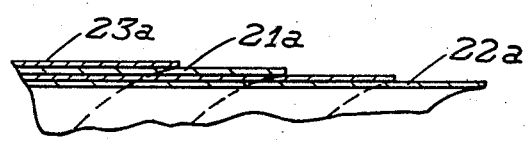
FIG. 7 is a partial view, in a greatly enlarged scale, showing a segment, partially in section, of a helically wound tube prepared on the apparatus of the present invention.

The finished wound product is shown in greater detail in FIG. 7 wherein the lacquered slip sheet 22a is provided as a base layer, this being covered with a layer of foil for example. The cardboard layer corresponds to the material 21a and provides the center layer of the finished product. The outer label is shown at 23a, this covering the other layers and forming the outer decorative cover and normally carrying indicia thereon.

It will be appreciated that the various examples given in connection with this application are for purposes of illustration only and there will be, accordingly, no intention of limiting the scope of the present invention to these details alone.

What is claimed is:

1. Apparatus for continuously preparing helically wound tubes from strip stock having register indicia arranged in spaced relationship along an outer surface thereof, said apparatus comprising a winding station and a cut-off station, said winding station including an axially extending mandrel with means for helically winding said strip stock in tubular form thereon and means for continuously moving said wound strip material axially along said mandrel at a precisely predetermined rate of speed, said cut-off station including cut-off means having control means cooperating therewith, said cut-off means being mounted along a certain track and being arranged to move periodically from a normal starting position in an axial direction therealong at said predetermined rate of speed and sever said helically wound strip material at predetermined spaced points therealong, said control means including a target detector, a register detector, position responsive means for detecting the presence of said cut-off means in said starting position, and actuating means arranged to be energized to move said cut-off means along said track, said target detector comprising condition responsive apparatus axially spaced from said mandrel and disposed at all times in laterally spaced relation to the formed tubing out of the path thereof and arranged to respond to the presence of tubing in a predetermined location axially along said mandrel, said register detector comprising condition responsive apparatus axially spaced from said mandrel and arranged to respond to the presence of register indicia at a certain predetermined location therealong, said actuating means being normally energized upon the coincident response of said target detector, said register detector, and said position responsive means.

2. Apparatus for continuously preparing helically wound tubes comprising a winding station and a cut-off station, said winding station including an axially extending mandrel with means for winding strip material having uniformly spaced registration marks arranged along a surface thereof, means for helically winding the strip material along the surface of said mandrel, and means for moving said strip material along said mandrel at a certain predetermined rate of speed, said cut-off station including cut-off means positioned adjacent said mandrel and control means therefor, said cut-off means being mounted along a track extending substantially parallel to the axis of said mandrel and being arranged to move periodically from a normal starting position in an axial direction at said predetermined rate of speed and sever said longitudinally moving strip material at a predetermined peripheral location, said control means including a target detector, a register detector, position responsive means for detecting the pressure of said cut-off means in said normal starting position, and actuating means responsive to said detectors to carry said cut-off means along said track and sever said tubing, said target detector comprising a photo-sensitive device positioned to view an area adjacent the axis of said mandrel and disposed at all times in laterally spaced relation to the formed tubing out of the path thereof and being arranged to respond to the presence of tubing in said area, said register comprising a photo-sensitive device positioned to view the surface of said helically wound strip material and being responsive to the presence of register indicia therealong, said actuating means being energized upon the coincident response of said target detector, said register detector, and said position responsive means.

3. Apparatus for continuously preparing helically wound tubes from strip stock having register indicia arranged in spaced relationship along an outer layer thereof, said apparatus comprising a winding station and a cut-off station, said winding station including an axially extending mandrel with means for supplying said strip material thereto under constant tension, means for winding said strip stock in tubular form thereon and means for continuously moving said wound strip material axially along said mandrel at a certain predetermined rate of speed, said cut-off station including cut-off means having control means co-operating therewith, said cut-off means being mounted along a certain track and being arranged to move periodically in an axial direction therealong at said certain predetermined rate of speed and sever said helically wound strip material at predetermined spaced points therealong, said control means including a target detector, a register detector, position sensing means in combination with said target detector and said register detector disposed along said track responsive to said cut-off means being disposed in normal starting position, and actuating means arranged to be energized to move said cut-off means along said track, said target detector comprising condition responsive apparatus axially spaced from said mandrel and disposed at all times in laterally spaced relation to the formed tubing out of the path thereof and arranged to respond to the presence of tubing in a predetermined location axially along said mandrel, said register detector comprising condition responsive apparatus axially spaced from said mandrel and arranged to respond to the presence of register indicia at a certain predetermined location therealong, said actuating means being energized upon the coincident response of said target detector, said register detector, and said position sensing control means.

4. Apparatus for continuously preparing individual lengths of helically wound tubes having an integral number of repetitive patterns thereon, each pattern including register indicia arranged along an outer surface thereof, said apparatus comprising a winding station and a cut-off station, said winding station including an axially extending mandrel with means for winding the strip material in tubular form thereon, and means for moving said strip axially along said mandrel at a certain rate of speed, said cut-off station including cut-off means positioned adjacent said mandrel and having control means therefor, said cut-off means being mounted along a certain track and being arranged to move periodically in an axial direction therealong parallel to the axis of said mandrel at said certain rate of speed and sever said longitudinally wound strip material at predetermined peripheral spaced locations thereon, said control means including a target detector, a register detector, position sensing means in combination with said target detector and said register detector disposed along said track responsive to said cut-off means being disposed in normal starting position, and actuating means for moving said cut-off means along said track, said target detector comprising condition responsive apparatus disposed at all times in spaced relation to the formed tubing out of the path thereof and arranged to respond to the presence of tubing in a predetermined location axially of said mandrel, said register detector comprising condition responsive apparatus arranged to respond to the presence of register indicia at a certain predetermined location, said actuating means being energized upon the coincident response of said target detector, said register detector, and said position sensing means.

5. Apparatus for continuously preparing lengths of helically wound tubes having an integral number of repetitive patterns thereon, each pattern including register indicia arranged along an outer surface thereof, said apparatus including a winding station and a cut-off station, said winding station including an axially extending mandrel with means for winding the strip material in tubular form thereon, and means for movng said strip material axially along said mandrel at a certain constant rate of speed, said cut-off station including cut-off means positioned adjacent said mandrel and having control means therefor, said cut-off means being mounted along a track and being arranged to move periodically in an axial direction parallel to the axis of said mandrel at said certain constant rate or speed and sever said longitudinally moving strip material at a predetermined peripheral location therealong, said control means including a target detector, a register detector, position sensing means in combination with said target detector and said register detector disposed along said track responsive to said cut-off means being disposed in normal starting position, and actuating means responsive to said detectors for moving said cut-off means along said track, said target detector comprising a photo-sensitive device positioned to view an area adjacent said mandrel and disposed at all times in laterally spaced relation to the formed tubing out of the path thereof and being arranged to respond to the presence of tubing in said area, said register detector comprising a photo-sensitive device positioned to view said register indicia and being arranged to respond to the presence thereof, said actuating means being energized upon the coincident response of said target detector, said register detector, and said position sensing means.

6. Apparatus for continuously preparing helically wound tubes from strip stock having register indicia arranged in space relationship along an outer layer thereof, said apparatus comprising a winding station and a cut-off station, said winding station including an axially extending mandrel with means for winding said strip stock in tubular form thereon and means for continuously moving said wound strip material axially along said mandrel at a certain predetermined rate of speed, said cut-off station including cut-off means having control means co-operating therewith, said cut-off means being mounted along a certain track and having a normally retracted position thereon and being arranged to move periodically in an axial direction therealong at said certain predetermined rate of speed and sever said helically wound strip material at predetermined spaced points therealong, said control means including a target detector, a register detector, position sensing means in combination with said target detector and said register detector disposed along said track responsive to said cut-off means being disposed in normal starting position, and actuating means arranged to be energized to move said cut-off means along said track, said target detector comprising condition responsive apparatus axially spaced from said mandrel and disposed at all times in laterally spaced relation to the formed tubing out of the path thereof and arranged to respond to the presence of tubing in a predetermined location axially along said mandrel, said register detector comprising a photosensitive device disposed to sense indicia along said tubing, reset means responsive to said cut-off means in said normally retracted position, said actuating means being energized upon the coincident response of said target detector, said register detector and said reset means, and secondary means for energizing said actuating means upon the lapse of a predetermined period of time after each response of the target detector if said actuating means has not previously been energized.

7. Apparatus for continuously preparing helically wound tubes from strip stock having register indicia arranged in spaced relationship along an outer surface thereof, said apparatus comprising a winding station and a cut-off station, said winding station including an axially extending mandrel with means for helically winding said strip stock in tubular form thereon operating against predetermined constant tension, and means for continuously moving said helically wound strip material axially along said mandrel at a precisely predetermined rate of speed, said cut-off station including cut-off means having control means co-operating therewith, said cut-off means being mounted for periodic back and forth rectilinear movement in a predetermined path and being disposed generally parallel to the axis of the wound tube, and position sensing means in combination with said target detector and said register detector disposed along said track responsive to said cut-off means being disposed in normal starting position, actuating means connected to said cut-off means for moving the same at said predetermined rate of speed and severing said helically wound strip material at predetermined spaced points therealong, said control means including a target detector, a register detector, and circuit means in combination therewith to energize said actuating means to move said cut-off means along said path, said target detector comprising condition responsive apparatus axially spaced from said mandrel and disposed at all times in laterally spaced relation to the formed tubing out of the path thereof and arranged to respond to the presence of tubing in a predetermined location axially along said mandrel, said register detector comprising condition responsive apparatus spaced outwardly from said mandrel and arranged to respond to the presence of register indicia on the wound strip stock at a certain predetermined location therealong, said actuating means being energized upon the coincident response of said target detector, said register detector, and said position sensing means.

8. Apparatus for cutting helically wound tubing of a certain predetermined length, each length including a plurality of integral unit patterns with register indicia arranged along a surface thereof, said apparatus comprising an axially extending mandrel carrying helically wound tubing therealong at a predetermined rate of speed, cut-off means including an actuating apparatus therefor, and sensing means arranged to control said actuating means, said cut-off means being mounted for periodic reciprocating movement from a certain normal starting position along a certain track which extends generally parallel to the axis of said mandrel and being arranged to sever said helically wound tubing at predetermined spaced points therealong, said sensing means including a target detector and a register detector, said target detector comprising condition responsive apparatus axially spaced from said mandrel and disposed at all times in laterally spaced relation to the formed tubing out of the path thereof and arranged to detect the presence of tubing in a predetermined location along said mandrel and reset said register detector in response to said presence, said register detector comprising condition responsive apparatus axially spaced from said mandrel and arranged to respond to the presence of register indicia at a certain predetermined location therealong, and position sensing control means in combination with said target detector and said register detector disposed along said track and being responsive to said cut-off means being disposed in normal starting position, said actuating means being energized upon the response of said position sensing control means and said register detector subsequent to resetting by said target detector.

9. Apparatus for cutting helically wound tubing of a certain predetermined length, each length including a plurality of integral unit patterns with register indicia for each integral unit pattern arranged along a surface thereof, said apparatus comprising an axially extending mandrel for carrying said helically wound tubing at a certain predetermined rate of speed therealong, cut-off means for severing said tubing at predetermined locations therealong, actuating means for moving said cut-off means, and sensing means arranged to control said actuating means, said cut-off means being arranged for periodic reciprocatory movement from a normal starting position at said predetermined rate of speed along a certain predetermined path, the longitudinal component of which is disposed generally parallel to said mandrel, the cut-off means being further arranged to sever the surface of said tubing, said sensing means including a target detector, position sensing means for determining the presence of said cut-off means in said normal starting position, and a register detector, said target detector comprising a photo-sensitive device and disposed at all times in laterally spaced relation to the formed tubing out of the path thereof positioned to view and area adjacent the axis of said mandrel and arranged to reset said register detector upon the presence of tubing in said area, said register detector comprising a photo-sensitive device positioned to view the surface of said helically wound strip material and being actively responsive to the next succeeding presence of register indicia therealong subsequent to resetting, said actuating means being energized upon the coincident response of said position sensing means, said target detector and said register detector.

10. The apparatus as defined in claim 9 being particularly characterized in that secondary means are provided for energizing said actuating means upon the elapse of a certain predetermined period of time after each response of the target detector if said actuating means has not previously been energized.

11. Apparatus for continuously producing helically wound tubes from strip material having register indicia arranged in spaced relation along an outer surface thereof, said apparatus comprising a winding station and a cut-off station, said winding station including an elongated mandrel with means for supplying a plurality of elongated strips thereto under constant tension, power means engaging said strips on said mandrel to helically form said strips into a continuous multi-layer tubular member continuously moving axially along said mandrel at a precisely uniform predetermined rate of speed, said cut-off station including cut-off means having control means cooperating therewith, said cut-off means being mounted for sliding movement axially of said mandrel with means for moving the same at the same rate of speed as the rate at which the helically wound tube is moving axially along said mandrel, said cut-off means including a cutter engaging the moving tube during said movement of said cut-off means to sever the helically wound tube at predetermined spaced points therealong, said control means including an electrical pulse producing target detector spaced at all times from the formed tube, an electrical pulse producing register detector and an electrical control circuit responsive for energization to successive pulses of first said target detector and second said register detector, and actuating means connected with said cut-off means and operated by said control circuit to move said cut-off means whenever said circuit is energized, said target detector arranged to respond to a predetermined length of formed tubing, said register detector comprising condition responsive apparatus arranged to respond to the presence of register indicia immediately following response of said target detector to complete said control circuit and operate said actuating means, and said control circuit including a time delay electrical switch means closing said control circuit after a predetermined time interval has elapsed following the pulse produced by said target detector regardless of whether or not said register detector responds to said indicia, to produce cutting of said continuous tube in the event said register detector is inoperative.

References Cited in the file of this patent
UNITED STATES PATENTS

| | | |
|---|---|---|
| 2,168,203 | Green | Aug. 1, 1939 |
| 2,623,445 | Robinson | Dec. 30, 1952 |
| 2,655,994 | Vandenberg | Oct. 20, 1953 |
| 2,699,099 | Robinson | Jan. 11, 1955 |
| 2,712,778 | Robinson | July 12, 1955 |
| 2,734,432 | Robinson et al. | Feb. 14, 1956 |